(12) United States Patent
Niizuma et al.

(10) Patent No.: US 6,505,581 B2
(45) Date of Patent: Jan. 14, 2003

(54) COOLING SYSTEM FOR VEHICULAR ENGINE

(75) Inventors: Keiichiro Niizuma, Saitama (JP); Takashi Matsuda, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/922,851

(22) Filed: Aug. 7, 2001

(65) Prior Publication Data

US 2002/0020367 A1 Feb. 21, 2002

(30) Foreign Application Priority Data

Aug. 11, 2000 (JP) ........................................ 2000-249181

(51) Int. Cl.⁷ .................................................. F02F 1/36
(52) U.S. Cl. .............................................. 123/41.82 R
(58) Field of Search ...................... 123/41.82 R, 41.1, 123/41.51

(56) References Cited

U.S. PATENT DOCUMENTS 5,111,774 A * 5/1992 Hiramoto et al. .......... 123/41.1
6,360,839 B1 * 3/2002 Urano et al. ................ 180/229

FOREIGN PATENT DOCUMENTS

JP         Y26224632         6/1987

* cited by examiner

Primary Examiner—Gene Mancene
Assistant Examiner—Hyder Ali
(74) Attorney, Agent, or Firm—Birch, Stewart, Kolasch & Birch, LLP

(57) ABSTRACT

In a cooling system for a vehicular engine wherein a cooling water storage chamber communicating with the top of a water jacket provided in an engine body is located at a position higher than the engine body, a connecting hose is not used, whereby it is intended to decrease the number of components used and facilitate the assembling work. A cooling water storage chamber is formed within a vessel member which is connected directly to an upper portion of an engine body.

14 Claims, 10 Drawing Sheets

COOLING SYSTEM FOR VEHICULAR ENGINE

CROSS-REFERENCE TO RELATED APPLICATIONS

The present application claims priority of Japanese Patent Application No. 2000-249181 filed on Aug. 11, 2000 the entire contents thereof are hereby incorporated by reference.

BACKGROUND OF THE INVENTION

1. Field of the Invention

The present invention relates to a cooling system for a vehicular engine wherein a cooling water storage chamber communicating with the top of a water jacket provided in an engine body is disposed at a position higher than the engine body.

2. Description of Background Art

A cooling system for an engine wherein a cooling water storage chamber communicating with the top of a water jacket is formed at a position higher than an engine body for venting air from a water jacket provided in the engine body, is disclosed, for example, in Japanese Published Examined Utility Model Application No. Sho 62-24623. According to the construction disclosed therein, a vessel member with a cooling water storage chamber formed therein and an engine body are connected together through a connecting hose.

In the above conventional cooling system it is necessary to use a connecting hose. The number of components used for the connection is not a small number. Besides, it is necessary that a connection between the engine body and the vessel member is done after mounting the engine body to the vehicle body frame. Connecting the engine body and the vessel member in this manner is troublesome.

SUMMARY AND OBJECTS OF THE INVENTION

The present invention has been accomplished in view of the abovementioned circumstances and it is an object of the invention to provide a cooling system for a vehicular engine which does not use a connecting hose and which thereby reduces the number of components used and facilitates the assembling work.

For achieving the above-mentioned object, according to the present invention there is provided a cooling system for a vehicular engine wherein an engine body of an engine for driving a driving wheel is supported by a vehicle body frame, and a cooling water storage chamber communicating with the top of a water jacket provided in the engine body is formed at a position higher than the engine body, wherein the cooling water storage chamber is formed within a vessel member connected directly to an upper portion of the engine body.

According to this configuration, since the vessel member which forms the cooling water storage chamber is directly connected to an upper portion of the engine body, it is possible to omit the connecting hose so far required and thereby reduce the number of components used. Besides, the assembling work becomes easier because the engine body with the vessel member connected thereto can be mounted to the vehicle body frame.

According to the present invention, there is provided a cooling system for a vehicular engine wherein the top of the water jacket is located at the highest position in a cooling water circulation circuit including the water jacket 70 and the radiator 75. The vessel member is formed in the shape of a pipe extending upwardly from the engine body in communication with the top of the water jacket and having an open upper end, and a filler cap is attached removably to an upper end of the vessel body.

According to this configuration it is possible to diminish restrictions imposed on the design of the cooling system. In a conventional cooling water circulation circuit, a filler cap is attached removably to a radiator so as to close an opening formed in an upper portion of the radiator, which upper portion of the radiator is located at the highest position in the cooling water circulation circuit. According to such a conventional structure, considerations are given so that at least the upper portion of the radiator is positioned higher than the engine body and so that a working space for pouring cooling water is ensured around the upper portion of the radiator. Those considerations have caused restrictions on the design of the cooling system. According to the present invention, since a filler cap is attached directly to the upper end of a pipe-like vessel member which is directly connected to the engine body, the degree of freedom in designing the layout of the radiator increases, and since a space for the maintenance of a spark plug, a fuel supply system and various sensors is originally ensured around the upper portion of the engine body, it is easy to ensure a space for pouring cooling water from the upper end of the vessel member or use an existing space for that purpose. Thus, it is possible to diminish restrictions on the design of the cooling system.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Embodiments of the present invention will be described hereinunder with reference to the accompanying drawings.

Figure 1:
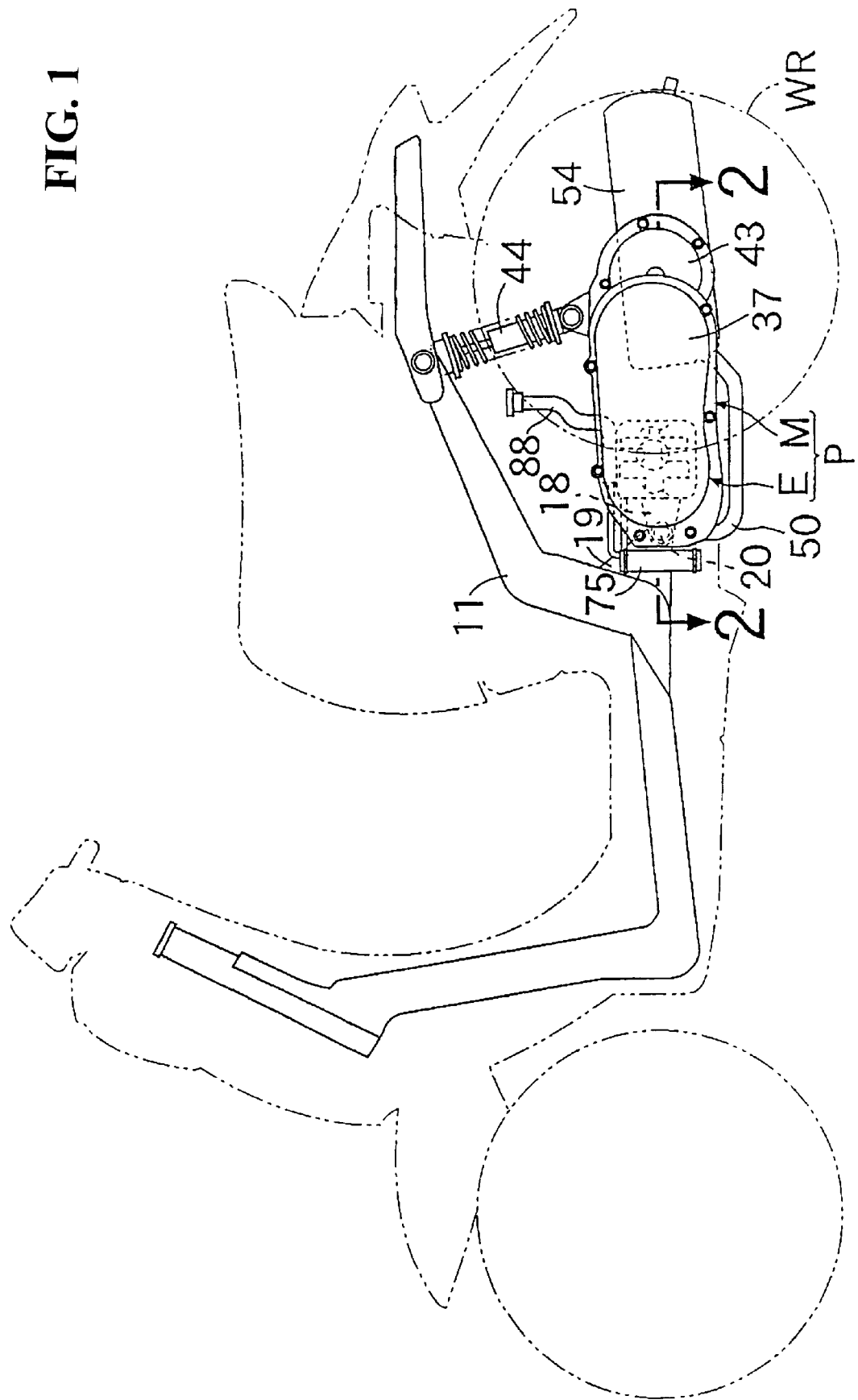
FIG. 1 is a side view of a vehicle body frame and a power unit.
Figure 2:
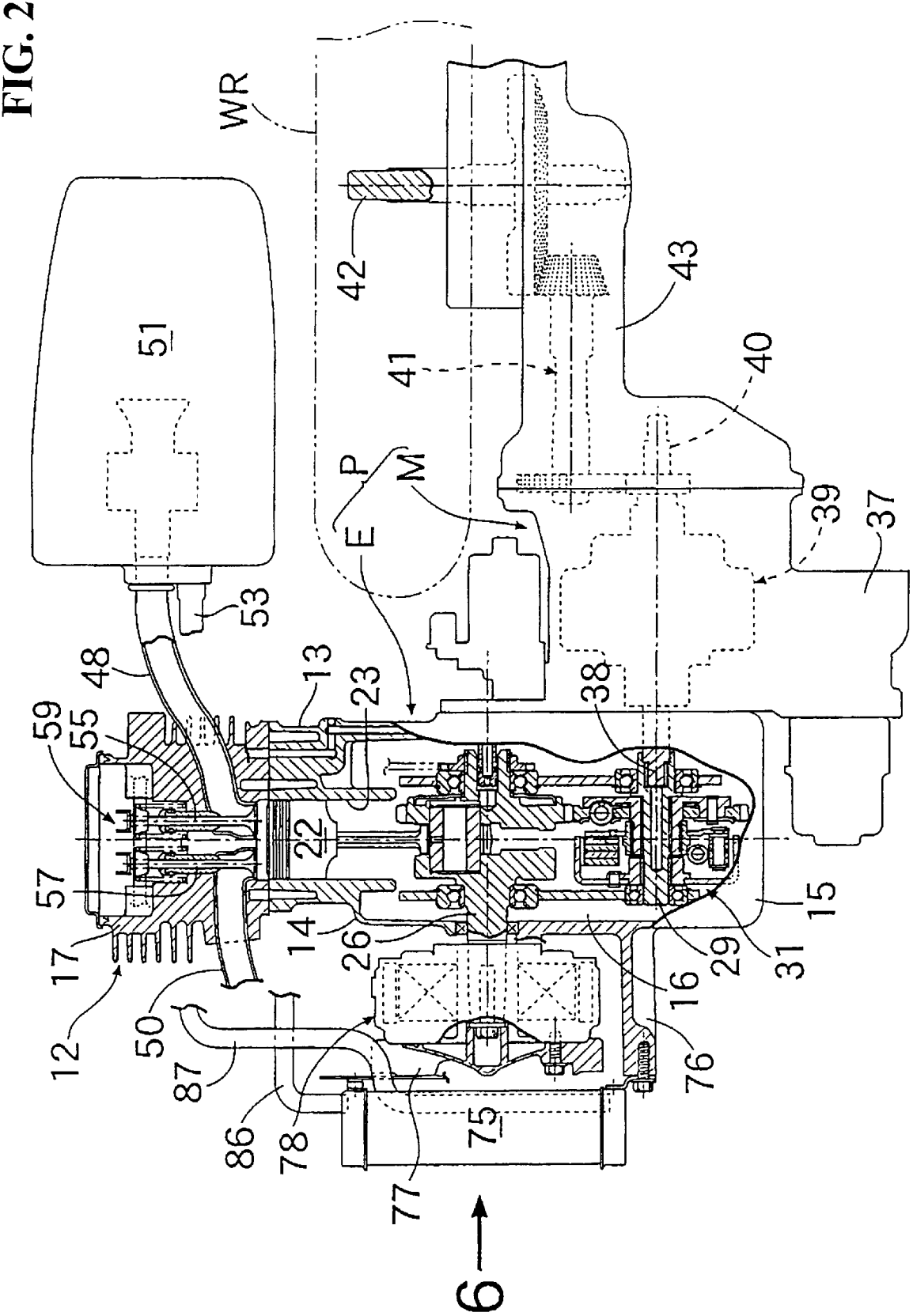
FIG. 2 is an enlarged sectional view taken on line 2—2 in FIG. 1.
Figure 3:
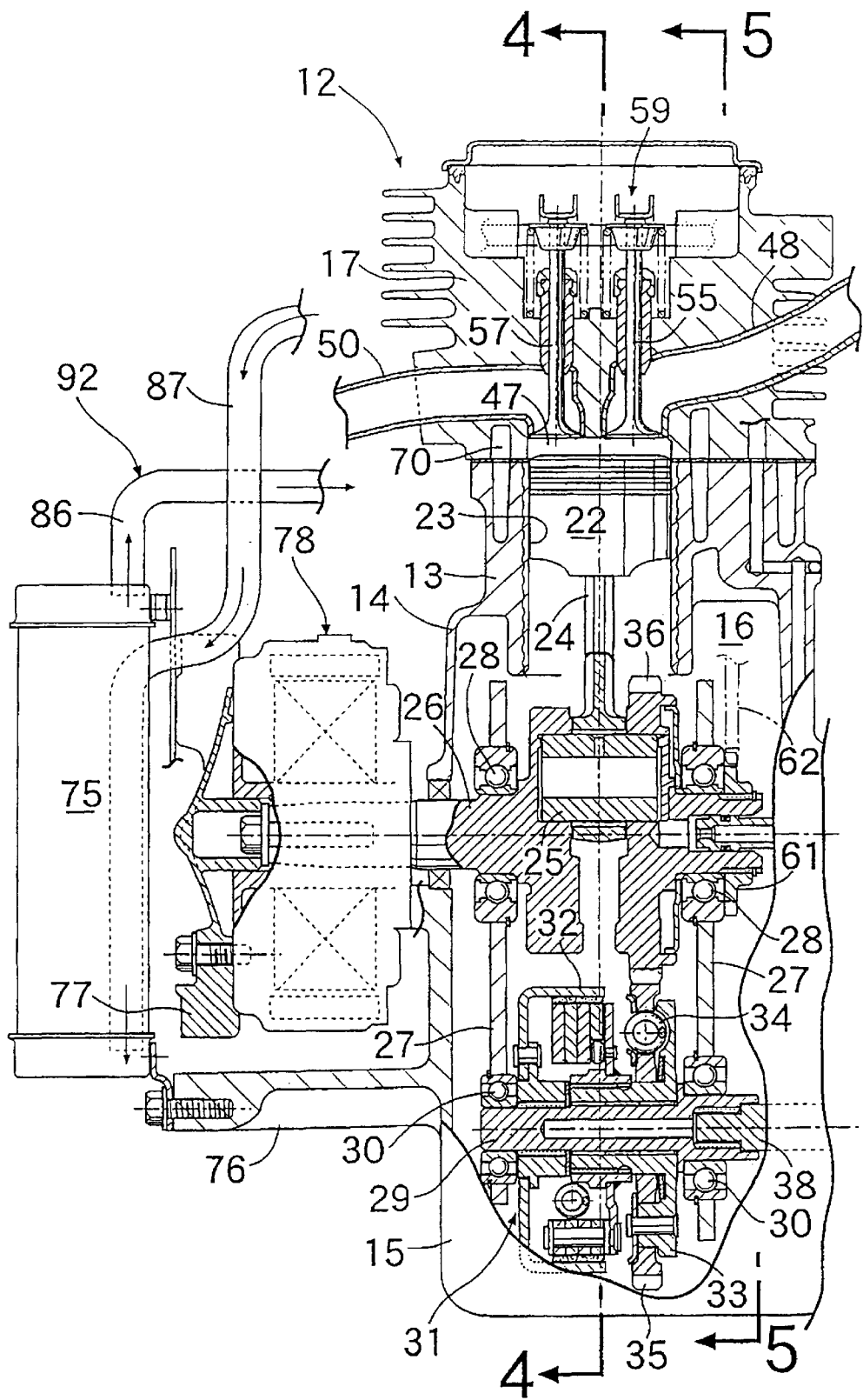
FIG. 3 is an enlarged view of a principal portion shown in FIG. 2.

In FIGS. 1 and 2, a power unit P includes a water-cooled type engine E and a continuously variable transmission M for shifting the output of the engine E in a stepless manner. The power unit P and the transmission M are carried on a vehicle body frame 11 of a motorcycle.

Referring to FIGS. 3 to 6 together, an engine body 12 of the engine E, which is a water-cooled type single-cylinder four-cycle engine, is provided with an engine block 13 integral with a crank case half 14 and a crank case half 15 which defines a crank chamber 16 therebetween. A cylinder head 17 is coupled to the engine block 13 on the side opposite to the crank case half 15.

A support portion 18 is integral with a front portion of the cylinder head 17 and is supported by a bracket 19 pivotably through a pivot shaft 20 having an axis extending in the width direction of the vehicle body frame 11 and also through a mounting rubber member 21. The bracket 19 is secured to the vehicle body frame 11. Thus, the engine body 12 is supported by the vehicle body frame 11 in a vertically pivotable manner.

A cylinder bore 23 is formed in the engine block 13 for slidable receiving a piston 22 therein. The engine body 12 is supported by the vehicle body frame 11 so that the axis of the cylinder bore 23 is slightly inclined rightwardly and upwardly.

A crank shaft 26 is connected to the piston 22 through a connecting rod 24 and a crank pin 25. The axis of the crank shaft 26 extends substantially horizontally in the longitudinal direction. Within the crank chamber 16, a pair of support plates 27, which are fixed to the engine block 13 and the crank case half 15, are spaced from each other in the axial direction of the crank shaft 26. The crank shaft 26 is supported by both support plates 27 rotatably through a pair of ball bearings 28.

Figure 5:
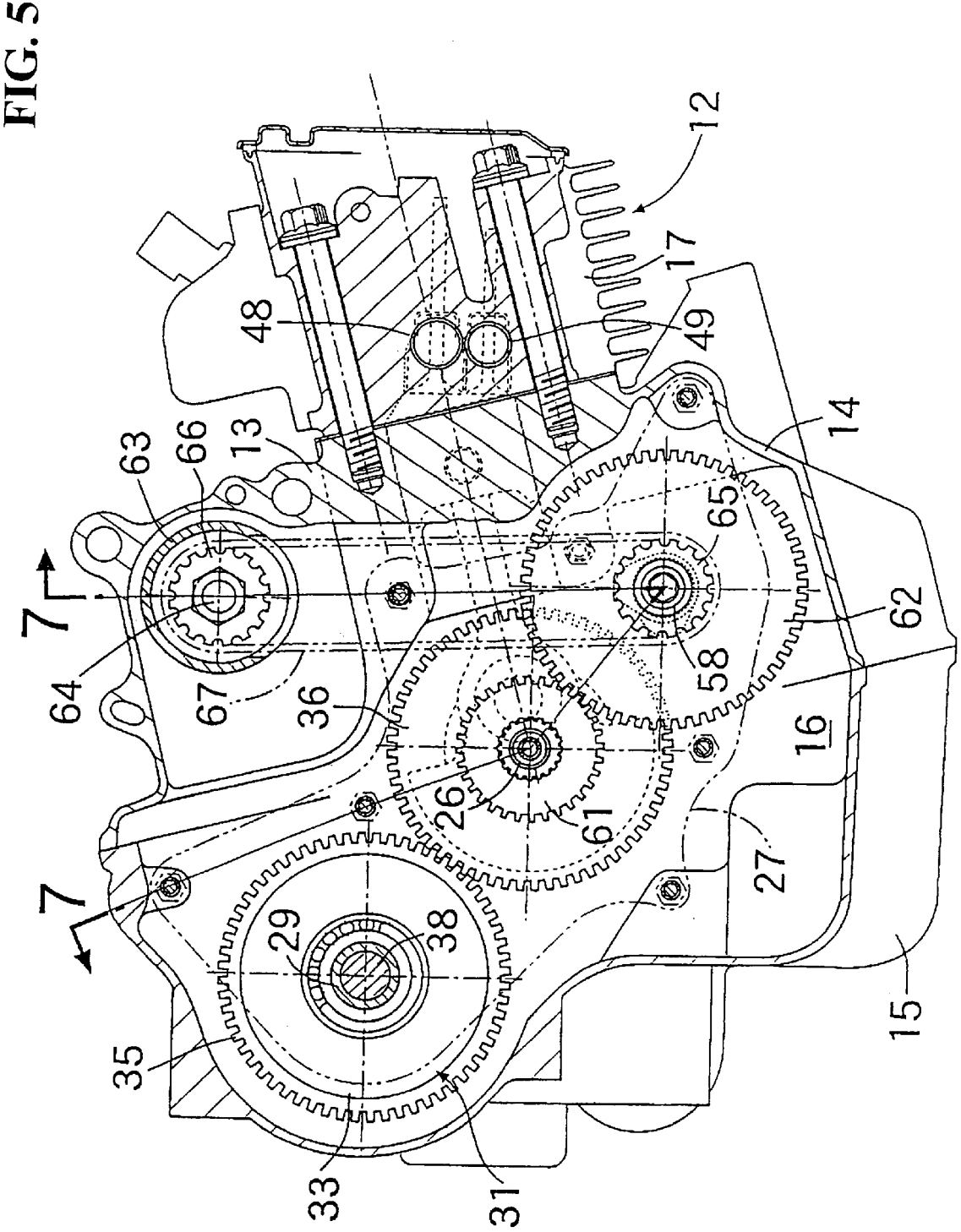
FIG. 5 is a sectional view taken on line 5—5 in FIG. 3.
Figure 6:
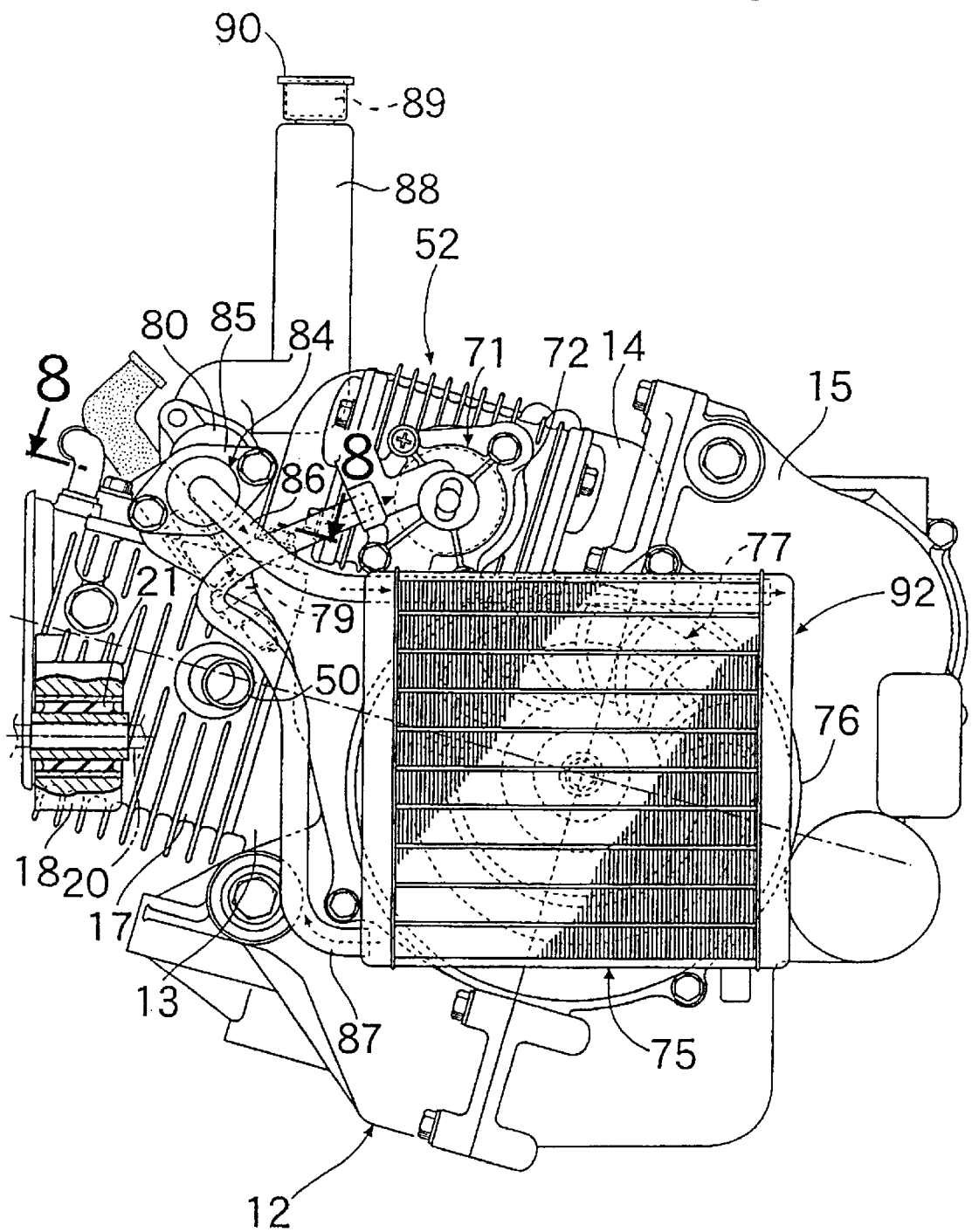
FIG. 6 is a view as seen in the direction of arrow 6 in FIG. 2.
Figure 7:
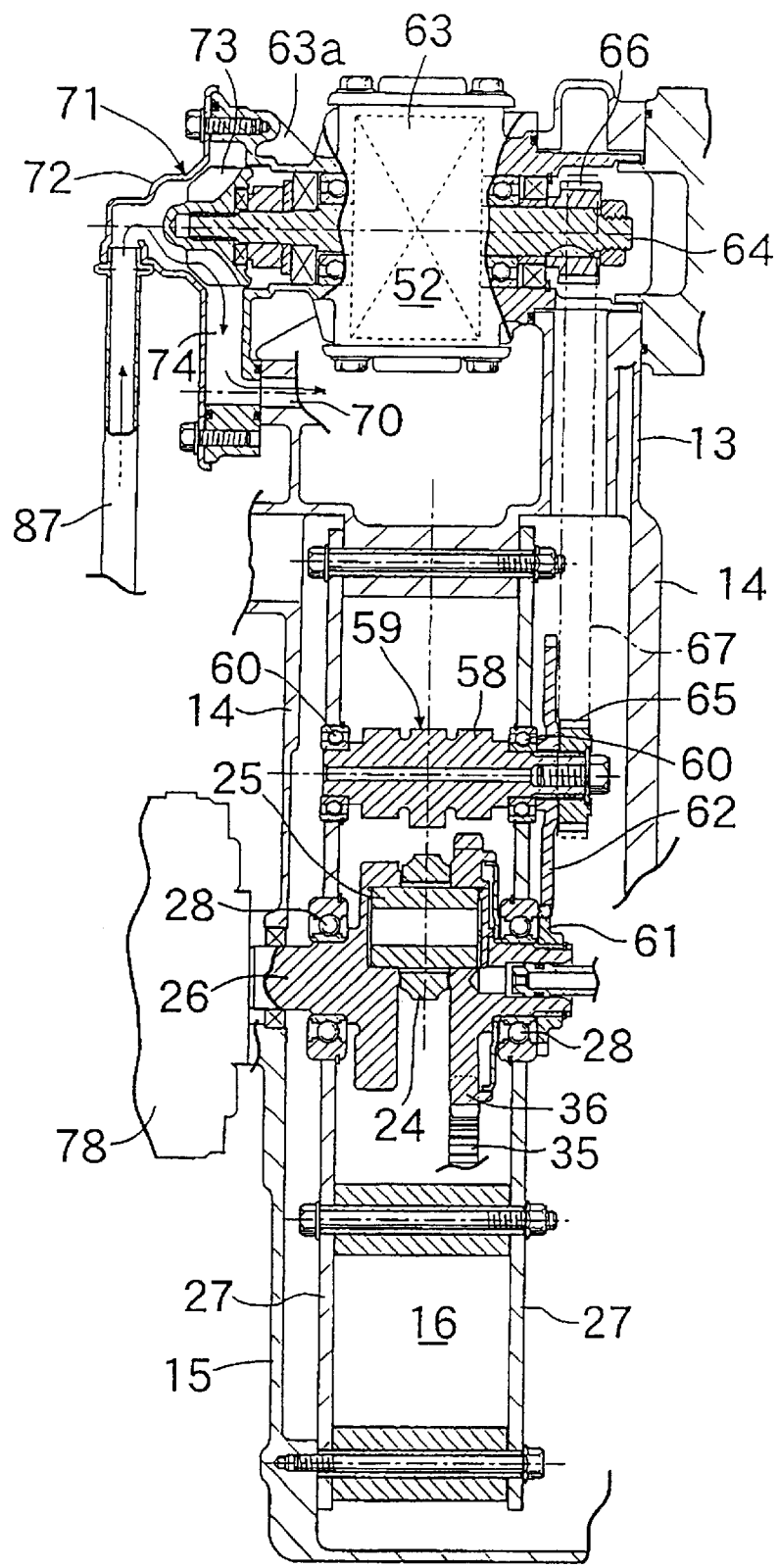
FIG. 7 is a sectional view taken on line 7—7 in FIG. 5.

Referring to FIG. 5, a transmission shaft 29 that is parallel to the crank shaft 26 is supported by both support plates 27 rotatably through a pair of ball bearings.

Figure 4:
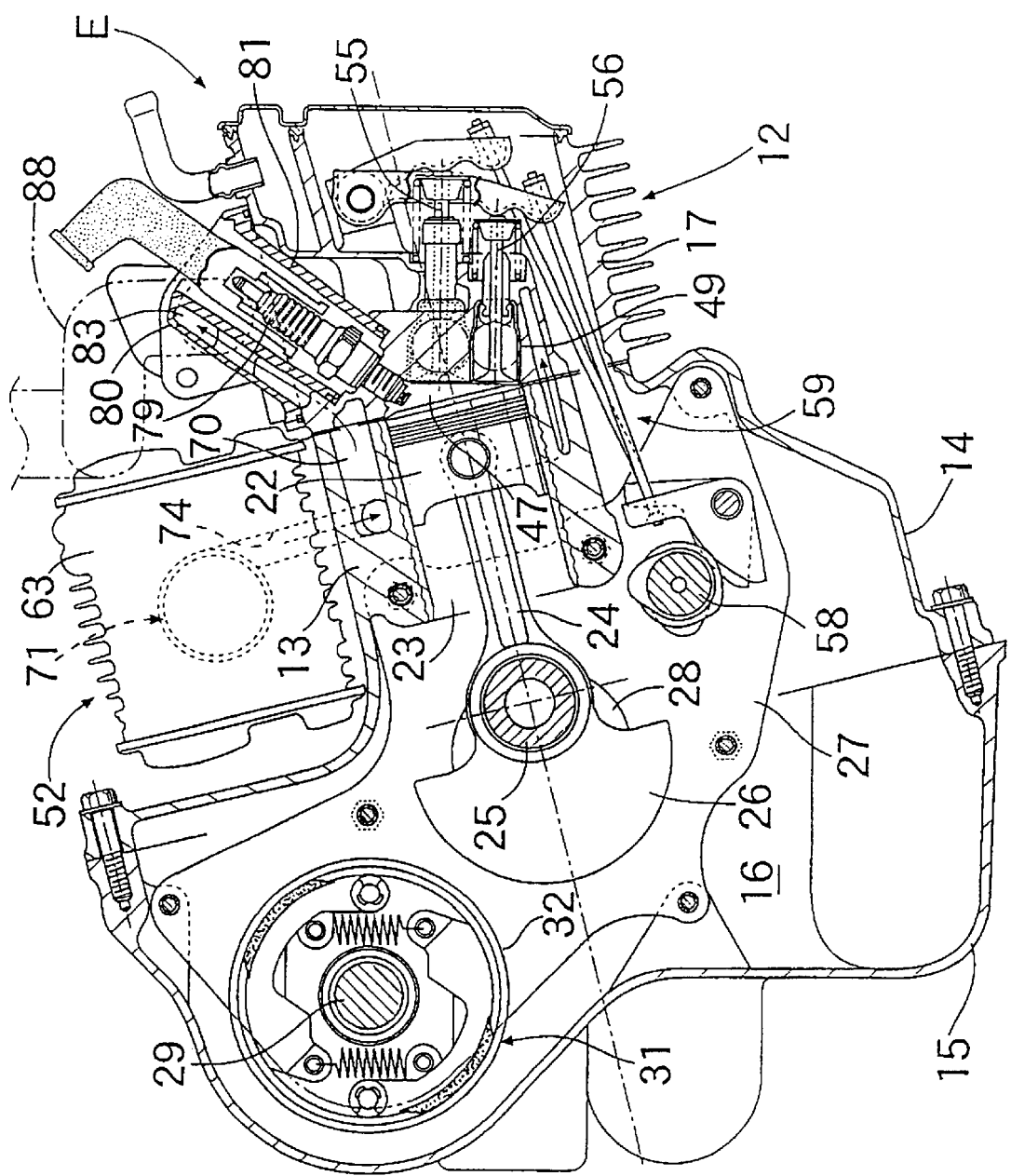
FIG. 4 is a sectional view taken on line 4—4 in FIG. 3.

As illustrated in FIGS. 4 and 5, a clutch outer 32 of a centrifugal clutch 31 is coupled to the transmission shaft 29, while a clutch inner 33 of the centrifugal clutch 32 is supported relatively rotatably by the transmission shaft 29. A driven gear 35 is connected to the clutch inner 33 through a damper spring 34 and is in mesh with a driving gear 36 mounted on the crank shaft 26.

A transmission case 37 of the continuously variable transmission M is clamped to both engine block 13 and crank case half 15 on a rear side with respect to the engine body 12. A gear shift mechanism 39 having an input shaft 38 connected coaxially with the transmission shaft 29 is received within the transmission case 37. An output shaft 40 of the gear shift mechanism 39 is connected to an axle 42 of a rear wheel WR through a reduction gear mechanism 41.

A transmission case 43 is disposed on the left-hand side of the rear wheel WR and is clamped to the transmission case 37. The reduction gear mechanism 41 is received within the transmission case 43 and the axle 42 is supported rotatably by the transmission case. A cushion unit 44 (see FIG. 1) is disposed between the transmission case 43 and the vehicle body frame 11.

Between the engine block 13 and the cylinder head 17 is formed a combustion chamber 47 to which the top of the piston 22 faces. An intake pipe 48, a supercharging pipe 49, and an exhaust pipe 50, which form an intake passage, a supercharging passage, and an exhaust passage, respectively, capable of communicating with the combustion chamber 47, are cast into the cylinder head 17 formed by casting.

An upstream end of the intake pipe 48 is connected to an air cleaner 51 (see FIG. 2) which is disposed on the right-hand side of the rear wheel WR, while an upstream end of the supercharging pipe 49 is connected to a supercharger 52, which in turn is connected to the air cleaner 51 through a conduit 53 (see FIG. 2). The exhaust pipe 50 extends rearwardly below the engine body 12 and a downstream end of the exhaust pipe 50 is connected to an exhaust muffler 54 (see FIG. 1) which is disposed on the right-hand side of the rear wheel WR.

An intake valve 55, a supercharging valve 56, and an exhaust valve 57, for selectively establishing and blocking communication of the intake pipe 48, supercharging pipe 49, and exhaust pipe 50 with the combustion chamber 47 are disposed in the cylinder head 17 in such a manner to be opened and closed. The intake valve 55, supercharging valve 56 and exhaust valve 57 are actuated for opening and closing motions by means of a valve operating mechanism 59 which is provided with a cam shaft 58.

The cam shaft 58, which has an axis parallel to the crank shaft 26, is disposed within the crank chamber 16 and is supported by both support plates 27 rotatably through a pair of ball bearings 60. In addition, a driving gear 61 fixed to the crank shaft 26 is in mesh with a driven gear 62 fixed to the cam shaft 58. Thus, the cam shaft 58 is connected and interlocked with the crank shaft 26 at a reduction ratio of ½.

The supercharger 52 has a rotary shaft 64 parallel to the crank shaft 26 and is disposed above the engine block 13. A housing 63 of the supercharger 52 rotatably supports the rotary shaft 64. The housing 63 is supported on the engine block 13.

A driving sprocket 65 is fixed to one end of the cam shaft 58 and a cogged belt 67 is entrained on a driven sprocket 66 fixed to one end of the rotary shaft 64 and also on the driving sprocket 65. Thus, the supercharger 52 is driven with power transmitted from the cam shaft 58.

In the engine body 12, a water jacket 70 is provided in both engine block 13 and cylinder head 17. A rotary shaft of a water pump 71 which supplies cooling water to the water jacket 70 on the engine block 13 side is constituted by the opposite end of the rotary shaft 64.

Pump vanes 73 are fixed to the opposite end of the rotary shaft 64 and a pump housing which receives the pump vanes 73 therein is made up of a housing portion 63a integral with the housing 63 of the supercharger 52 and a pump cover 72 clamped to both housing portion 63a and engine block 13. A water supply passage 74 for conducting cooling water discharged from the water pump 71 to the water jacket 70 in the engine block 13 is formed in the pump cover 72.

A radiator 75 for radiating heat of the cooling water discharged from the water jacket 70 is disposed in front of the engine body 12. The radiator 75 is formed in a circular shape coaxial with the crank shaft 26 and is supported by a supporting cylindrical portion 76 provided in both engine block 13 and crank case half 15. Within the supporting cylindrical portion 76, a cooling fan 77 which draws cooling air so as to flow through the radiator 75 is fixed to an end portion of the crank shaft 26. A generator 78, which is driven by the crank shaft 26, is disposed between the cooling fan 77 and the engine body 12.

Figure 8:
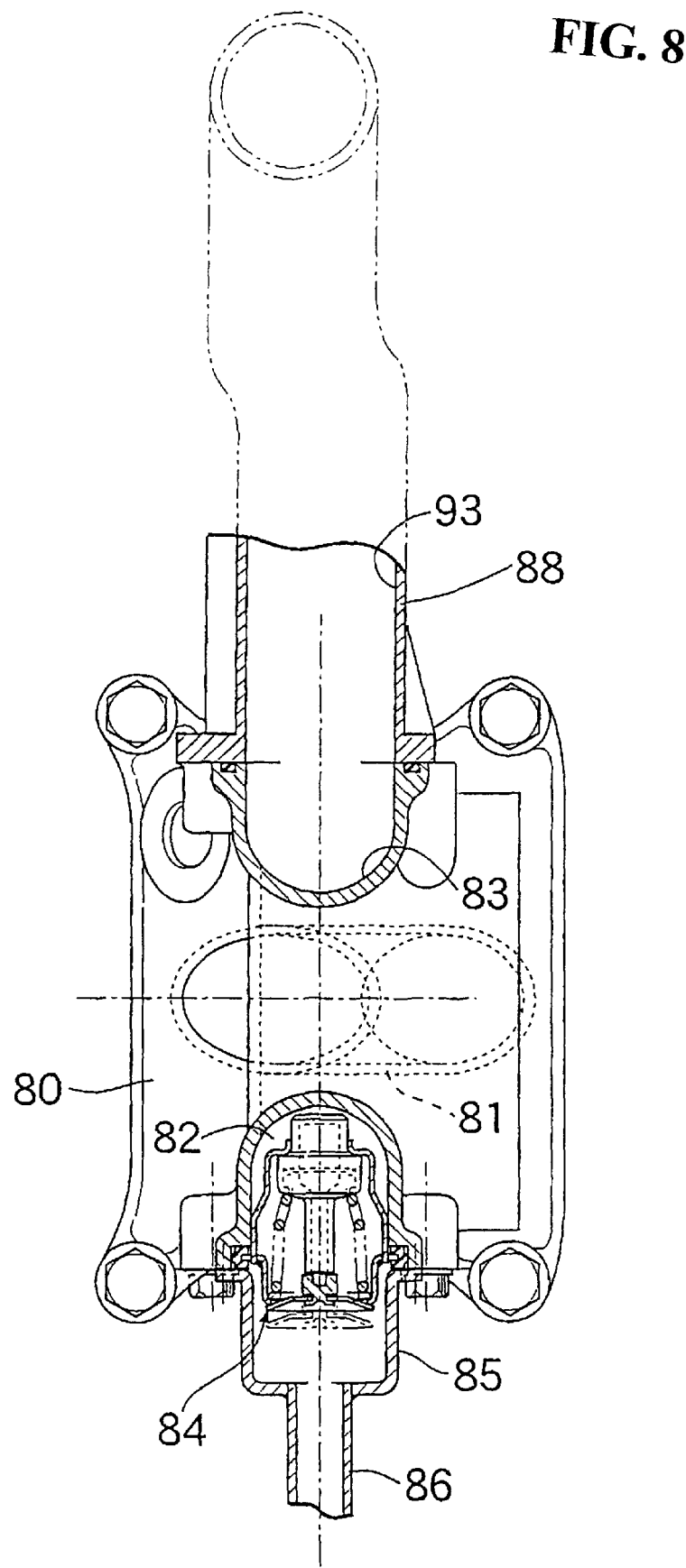
FIG. 8 is an enlarged sectional view taken on line 8—8 in FIG. 6.

Referring also to FIG. 8, a cover 80 which constitutes a part of the engine body 12 is clamped to an upper portion of the cylinder head 17 and a plug inserting cylindrical portion 81 for insertion therein of a spark plug 79 is integral with the cover 80, the spark plug 79 is mounted to the cylinder head 17 so as to face the combustion chamber 47.

A first passage 82 which constitutes a part of the water jacket 70 and a second passage 83 which constitutes a part of the water jacket 70 are formed in the cover 80. The inserting cylindrical portion 81 between the second passage 83 and the first passage 82 serves as the top of the water jacket 70.

Figure 9:
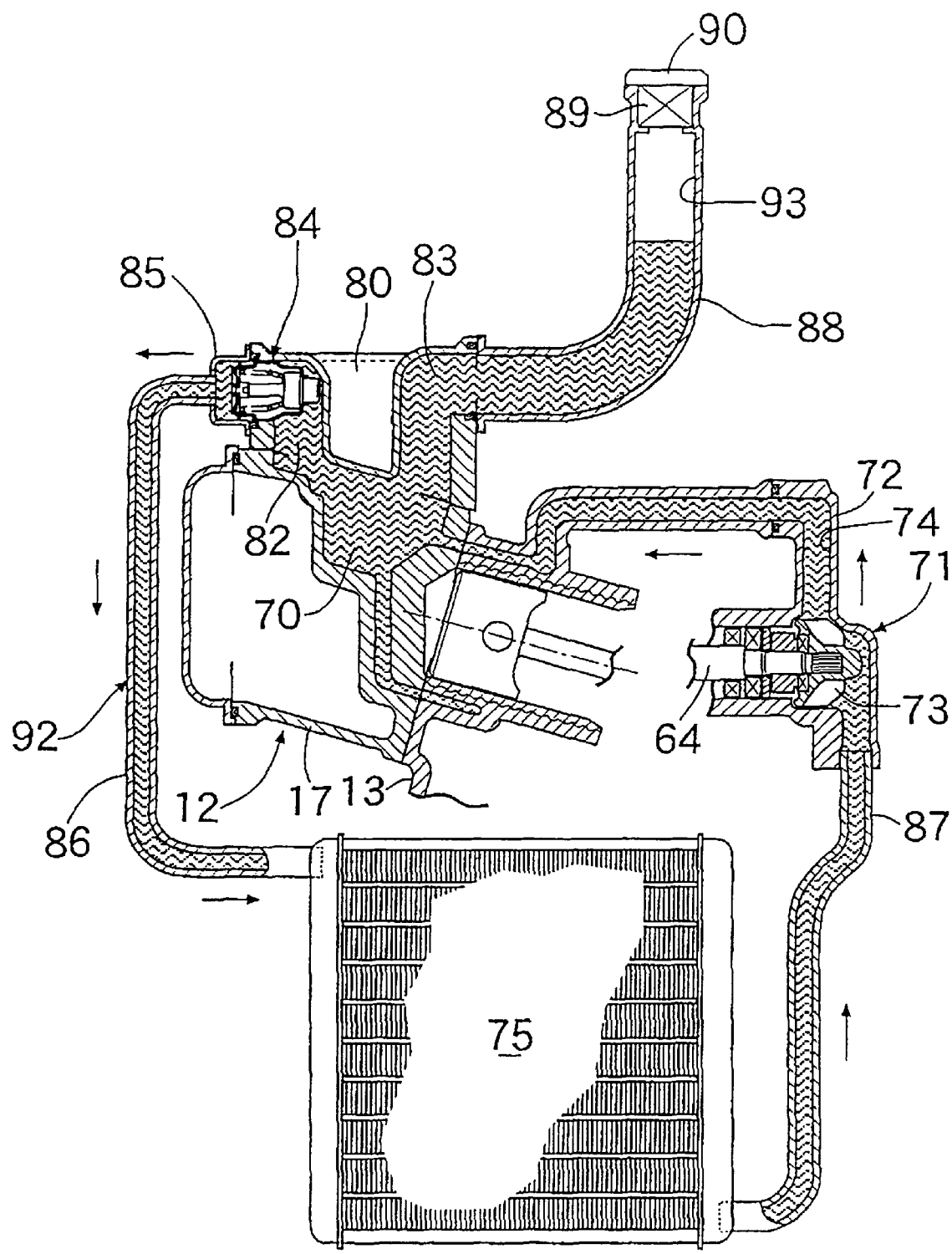
FIG. 9 is a diagram showing a circuit configuration of a cooling system embodying the invention.

Referring also to FIG. 9, a thermostat 84 is installed in the cover 80 to control the flow of cooling water between the first passage 82 and the radiator 75 in accordance with the temperature of the cooling water. The thermostat 84 is held between the cover 80 and a thermostat cover 85 which is clamped to the cover 80. The thermostat 84 operates to cut off communication between a conduit 86 and the first passage 82 when the temperature of cooling water is low, the conduit 86 providing a connection between the thermostat cover 85 and the radiator 75, and provide communication between the conduit 86 and the first passage 82 as the cooling water temperature rises. The radiator 75 and the pump cover 72 of the water pump 71 are interconnected through a conduit 87. The water pump 71 draws cooling water from the radiator 75 and supplies it to the engine block 13 side of the water jacket 70.

A cooling water circulation circuit 92 is constituted by the water jacket 70, water pump 71, radiator 75, thermostat 84 and conduits 86, 87, and the second passage 83 formed within the cover 80 and serving as the top of the water jacket 70 is located at the highest position in the cooling water circulation circuit 92.

A vessel member 88 is disposed above the engine body 12 in communication with the interior of the water jacket 70 and forms a cooling water storage chamber 93. A lower portion of the vessel member 88 is connected directly to the cover 80 so as to communicate with the second passage 83 which is the top of the water jacket 70. The vessel member 88 is formed by bending a pipe so as to extend upwardly from the cover 80 and to be open at an upper end thereof.

Further, a filler cap 90 is fitted in the upper end of the vessel member 88 and a pressure valve 89 is attached to the filler cap 90. The pressure valve 89 operates to close the upper end of the vessel member 88 when the internal pressure of the water jacket 70, namely, the internal pressure of the cooling water storage chamber 93, is a positive pressure below a preset value, and open the upper end of the vessel member 88 when the internal pressure of the cooling water storage chamber 93 is above the preset value and also when the internal pressure is a negative pressure.

The operation of this embodiment will now be described. The lower portion of the vessel member 88 disposed above the engine body 12 and forming the cooling water storage chamber 93 is connected directly to the cover 80 which constitutes a part of the engine body 12 supported by the vehicle body frame 11 and which is clamped to the upper portion of the cylinder head 17, so as to communicate with the top of the water jacket 70 provided in the engine body 12.

Consequently, the connecting hose so far required can be omitted, and in connection with the configuration for connecting the vessel member 88 to the water jacket 70 it is possible to reduce the number of components used. Moreover, since the engine body 12 with the vessel member 88 connected thereto can be mounted to the vehicle body frame 11, the assembling work becomes easier than in the prior art in which the engine body 12 and the vessel member 88 are connected together using a connecting hose after mounting the engine body 12 to the vehicle body frame 11.

In this embodiment, moreover, the engine body 12 is supported swingably by the vehicle body frame 11, so if the engine body 12 and the vessel member 88 are interconnected using a connecting hose as in the prior art, it is necessary to consider the influence on durability of the connecting hose because the connecting hose is bent with swing motions of the engine body 12, thus giving rise to a restriction on design. But in this embodiment such a restriction on design does not occur because the connecting hose is not used.

Further, the second passage 83 as the top of the water jacket 70 is located at the highest position in the cooling water circulation circuit 92 including the water jacket 70 and the radiator 75, and the filler cap 90 is attached removably to the upper end of the vessel member 88, the vessel member 88 is formed in the shape of a pipe extending upwardly from the engine body 12 in communication with the top of the water jacket 70 and having an open upper end, whereby it is possible to diminish the restrictions on the design of the cooling system.

Generally, in the conventional cooling water circulation circuit, a filler cap is attached removably to the radiator so as to close an opening formed in an upper portion of the radiator and the radiator upper portion is located at the highest position in the cooling water circulation circuit. According to such a conventional structure, restrictions on the design of a cooling system occurred due to the necessity of giving consideration to disposing at least an upper portion of the radiator at a position higher than the engine body and also due to the necessity of giving consideration to ensuring a working space for the pouring of cooling water around the upper portion of the radiator.

In the above embodiment of the present invention, since the filler cap 90 is attached directly to the upper end of the pipe-like vessel member 88 which is connected directly to the engine body 12, the degree of freedom in designing the layout of the radiator 75 increases. Besides, a space for the maintenance of spark plug, fuel supply system and various sensors is originally ensured around the upper portion of the engine body 12, it is easy to newly ensure a space for pouring cooling water from the upper end of the vessel member 88 or use an existing space for that purpose, whereby restrictions on designing the cooling system can be diminished.

Figure 10:
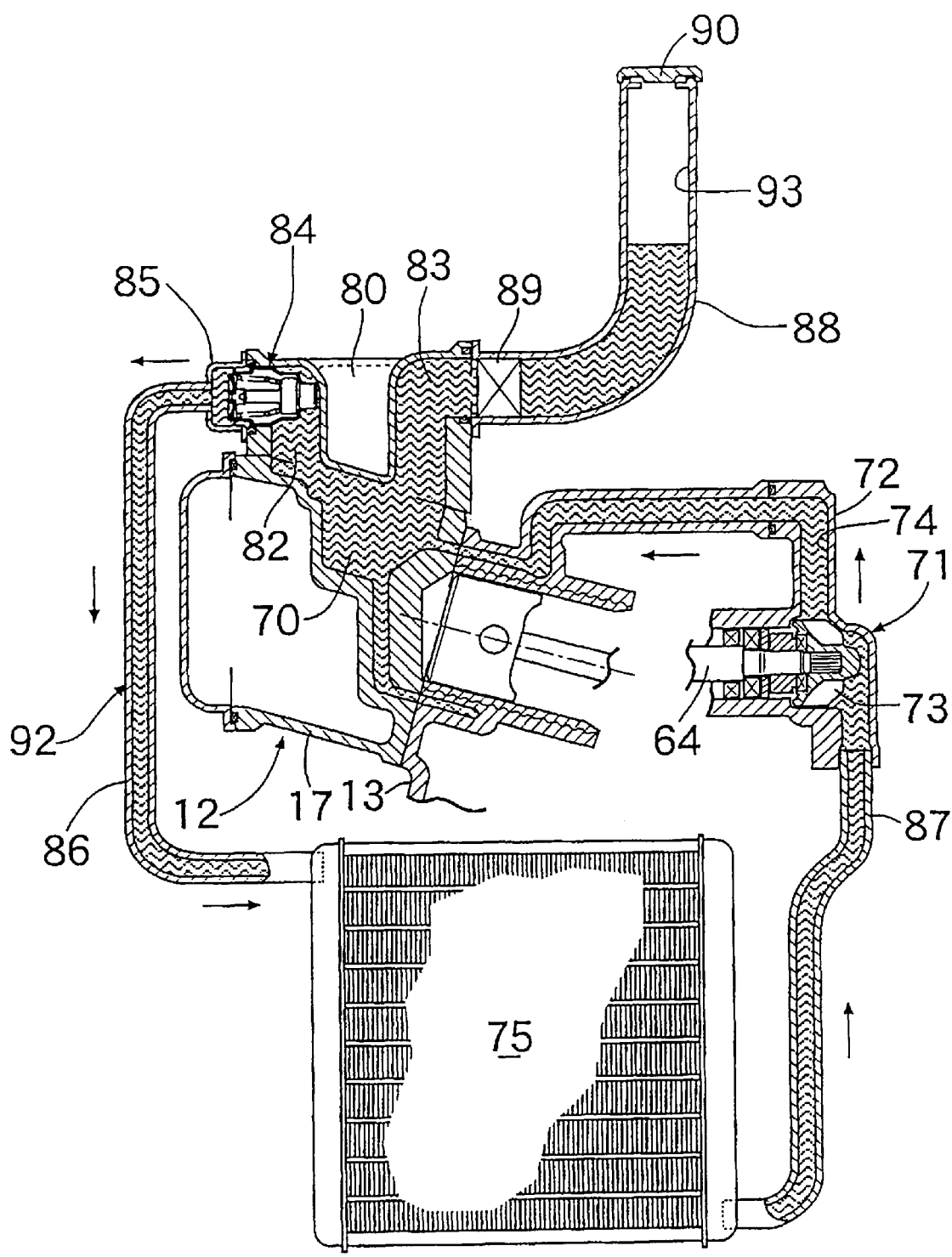
FIG. 10 is a diagram showing a circuit configuration of a cooling system according to another embodiment of the present invention.

According to another embodiment of the present invention, as shown in FIG. 10, a pressure valve 89 is installed in a lower portion of the vessel member 88.

Although embodiments of the present invention have been described above, the present invention is not limited to those embodiments, but various design modifications may be made without departing from the scope of the invention described in the claims.

For example, although in the above embodiments a description has been given of the case where the engine body 12 is supported swingably by the vehicle body frame 11 of the motorcycle, the present invention is also applicable to other vehicles such as a three-wheeled motor vehicle and further applicable to the case where the engine body is supported by the vehicle body frame unswingably.

Thus, according to the present invention, the use of a connecting hose which has heretofore been required is omitted, whereby the number of components used can be decreased and the assembling work becomes easy.

According to the present invention, it is possible to diminish restrictions imposed on designing the cooling system.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cooling system for a vehicular engine wherein an engine body of an engine for driving a driving wheel is supported by a vehicle body frame comprising:

a cooling water storage chamber communicating with a top of a water jacket provided in the engine body, said cooling water storage chamber being formed at a position higher than the engine body;

said cooling water storage chamber being formed within a vessel member connected directly to an upper portion of the engine body, wherein the top of the water jacket is located at the highest position in a cooling water circulation circuit including a water jacket and a radiator, the vessel member is formed in the shape of a pipe extending upwardly from the engine body in communication with the top of the water jacket and having an open upper end, and a removable filler cap is attached to an upper end of the vessel member.

2. The cooling system for a vehicular engine according to claim 1, further including a pressure valve operatively mounted relative to said vessel member for closing the vessel member when the internal pressure reaches a predetermined pressure.

3. The cooling system for a vehicular engine according to claim 2, wherein said pressure valve is located adjacent to an upper end of the vessel member.

4. The cooling system for a vehicular engine according to claim 2, wherein said pressure valve is located adjacent to an upper portion of said engine body.

5. The cooling system for a vehicular engine according to claim 1, wherein said vessel member is a tube being bent and extending upwardly from a fitting on an upper portion of said engine body for forming the cooling water storage chamber.

6. The cooling system for a vehicular engine according to claim 1, wherein said engine is swingably mounted relative to said vehicle body frame and said vessel member is movable together with movement of said engine.

7. The cooling system for a vehicular engine according to claim 1, and further including a thermostat for controlling the flow of cooling water between the radiator and the water jacket.

8. A cooling system for a vehicular engine comprising:

an engine body of an engine, said engine body including an upper portion;

a water jacket provided in the engine body; and a cooling water storage chamber communicating with a top of said water jacket, said cooling water storage chamber being formed at a position higher relative to the engine body, and said cooling water storage chamber being formed within a vessel member connected directly to the upper portion of the engine body, wherein said vessel member is a tube being bent and extending upwardly from a fitting on an upper portion of said engine body for forming the cooling water storage chamber.

9. The cooling system for a vehicular engine according to claim 8, wherein the top of the water jacket is located at the highest position in a cooling water circulation circuit including a water jacket and a radiator, the vessel member is formed in the shape of a pipe extending upwardly from the engine body in communication with the top of the water jacket and having an open upper end, and a removable filler cap is attached to an upper end of the vessel member.

10. The cooling system for a vehicular engine according to claim 9, further including a thermostat for controlling the flow of cooling water between the radiator and the water jacket.

11. The cooling system for a vehicular engine according to claim 8, further including a pressure valve operatively mounted relative to said vessel member for closing the vessel member when the internal pressure reaches a predetermined pressure.

12. The cooling system for a vehicular engine according to claim 11, wherein said pressure valve is located adjacent to an upper end of the vessel member.

13. The cooling system for a vehicular engine according to claim 11, wherein said pressure valve is located adjacent to an upper portion of said engine body.

14. The cooling system for a vehicular engine according to claim 8, wherein said engine is swingably mounted relative to a vehicle body frame and said vessel member is movable together with movement of said engine.

* * * * *